Aug. 14, 1928.

E. O. ADKINS 1,680,835

UNDERCUTTING TOOL FOR COMMUTATORS

Original Filed March 10, 1926   3 Sheets-Sheet 1

Witnesses

Elba O Adkins, Inventor

Attorney

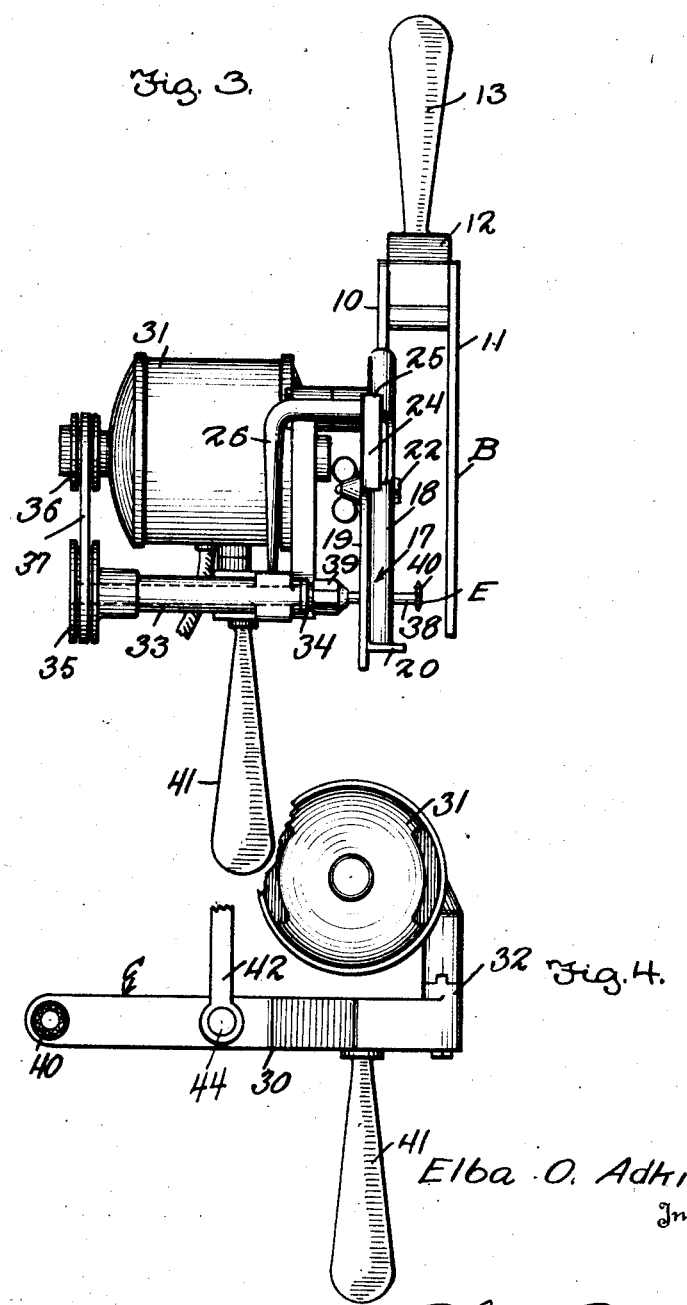

Aug. 14, 1928.  
E. O. ADKINS  
1,680,835  
UNDERCUTTING TOOL FOR COMMUTATORS  
Original Filed March 10, 1926   3 Sheets-Sheet 3
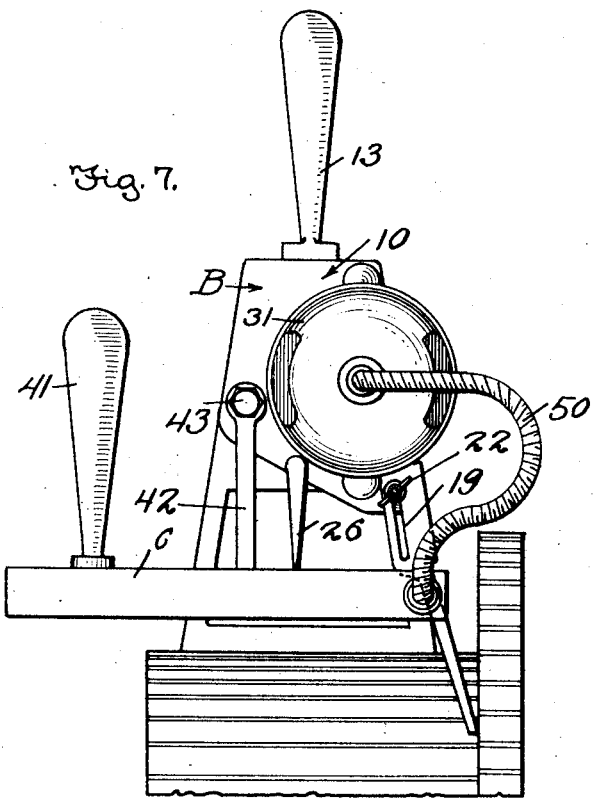
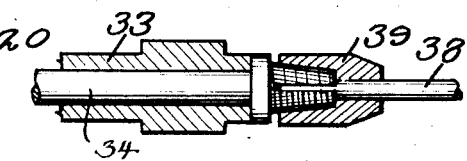
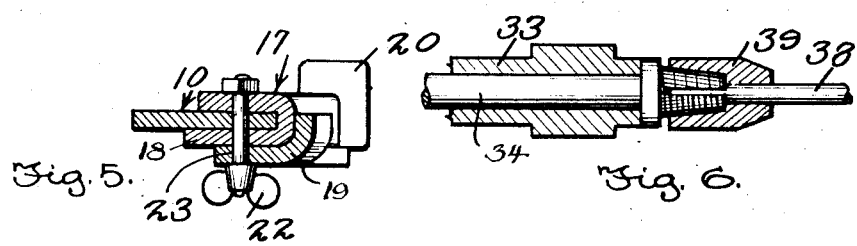
Elba O. Adkins, Inventor Patented Aug. 14, 1928.

1,680,835

UNITED STATES PATENT OFFICE.

ELBA O. ADKINS, OF HUNTINGTON, WEST VIRGINIA, ASSIGNOR OF ONE-HALF TO THE HUNTINGTON AUTO SUPPLY COMPANY, OF HUNTINGTON, WEST VIRGINIA, A CORPORATION OF WEST VIRGINIA.

UNDERCUTTING TOOL FOR COMMUTATORS.

Application filed March 10, 1926, Serial No. 93,815. Renewed June 20, 1927.

This invention appertains to a novel device for undercutting the mica spacing strips for the segments of commutators in generators and motors.

The primary object of the present invention is to provide a novel portable tool for engaging the commutator comprising a novel undercutting wheel for the mica strips with novel means associated with the device for holding the same in place relative to the commutator.

In the use of generators and motors the segments become worn leaving the spacing strips generally formed of mica protruding beyond the periphery of the commutator which causes difficulty familiar with all users of such appliances.

Various methods have been proposed for dressing the commutator and for undercutting the mica strips which methods have failed to give the maximum amount of satisfaction.

It is therefore another object to provide an undercutting tool which can be readily associated with all sizes of generators and motors and makes thereof irrespective of the length of the commutator, the tool embodying a novel supporting frame for engaging the commutator and a novel swinging frame carrying the dressing or undercutting wheel for the said strips.

A further object of the invention is to provide novel means for connecting the swinging frame with the supporting frame whereby the undercutting wheel will have a relatively long stroke to permit the use of the tool on different sized commutators and whereby the undercutting wheel can be maintained substantially parallel to the axis of the commutator during the entire stroke thereof.

A further object of the invention is the provision of a novel adjustable rest carried by the supporting frame for engaging the risers of the commutator, said rests being movable relative to the height of the risers.

A still further object of the invention is to provide a novel portable undercutting tool for the mica spacing strips of a commutator of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated in the accompanying drawings, in which drawings:

Figure 3 is a front elevation of the tool,

Figures 1, 2:
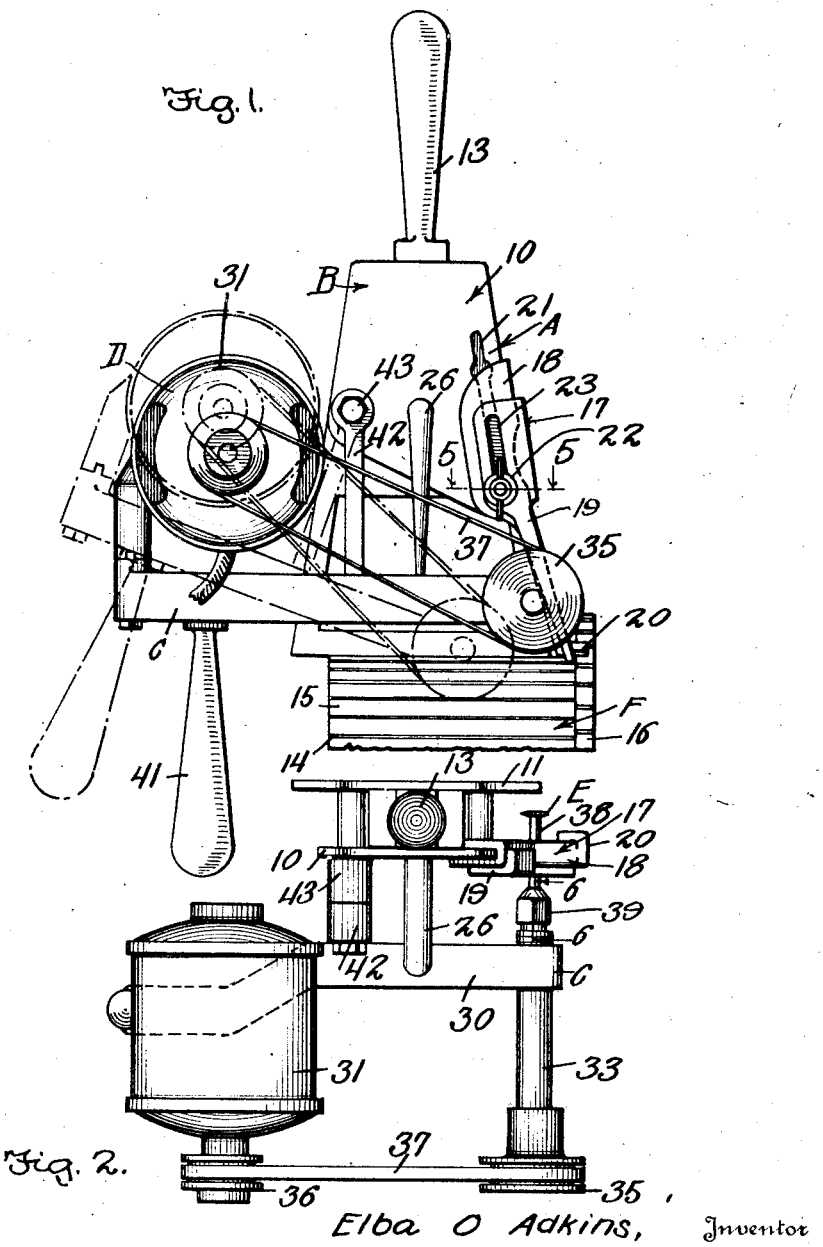
Figure 1 is a side elevation of the improved tool showing the same, in full lines, in a position of rest on a commutator, and in operative position, in dotted lines.
Figure 2 is a top plan view of the improved tool.

Figure 4 is a fragmentary inner side elevation of the swinging frame showing the novel undercutting wheel, Figure 5 is a detail section taken on the line 5—5 of Figure 1 illustrating the novel means of adjustably associating the rest with the supporting frame, and Figure 6 is a detail section taken on the line 6—6 of Figure 2 illustrating the means of detachably connecting the undercutting wheel with the drive shaft, Figure 7 is a side elevation of the tool showing a slightly modified form thereof.

Referring to the drawings in detail, wherein similar reference characters designate the corresponding views, the letter A generally indicates the improved portable tool which comprises a supporting frame B, a swinging frame C, and a drive means D for the undercutting wheel E.

The supporting frame B comprises inner and outer plates 10 and 11 which are held in spaced relation by a handle 12. The handle 12 extends above the plates and is provided with a suitable hand grip 13, the purpose of which will be hereinafter more fully described. The outer plate 11 is of a substantially frusto-triangular shape and has its base portion extended below the inner plate 10, which base portion is adapted to rest directly upon the commutator indicated by the reference character F. The commutator F can be considered of any desired construction including the usual copper segments 15 and mica spacing strips 14. The segments 15 at one end are provided with the usual risers 16. The plate 11 can be provided with suitable apertures so as to lighten the weight thereof. The forward edge of the inner plate 10 has adjustably associated therewith the rest 17 which embodies adjustable legs 18 and 19. The leg 18 is of a substantially U-shape in cross section and is slidably mounted upon the said plate 10, the flanges of the leg engaging the opposite faces of the plate. The lower end of the leg projects forwardly from the plate and is provided with a foot 20 which is arranged substantially in a horizontal plane for engaging the outer edge of the risers 16. A slot 21 is formed in the plate 10 adjacent to and parallel with the front edge thereof and a suitable bolt is extended through the slot and the U-shaped leg for holding the leg in its adjusted position. The bolt is generally indicated by the reference character 22. The leg 19 gradually tapers toward a point for resting against the inner face of the risers 16 and the leg normally rests upon one side face of the leg 18 and is provided with a longitudinally extending slot 23 through which the bolt 22 extends. By this arrangement the leg 19 can be adjusted independently of the leg 18 either longitudinally thereof or forwardly or rearwardly thereof, swinging upon the bolt as an axis. The forward edge of the leg 19 can be provided with a guide flange 24 for engaging the leg 18 and the leg 18 can be notched as at 25 to permit the swinging of the leg 19 when necessary.

A stop arm 26 is carried by the plate 10 and extends in spaced parallel relation thereto and forms means for limiting the swinging movement of the frame C in one direction as will be hereinafter described.

The frame C comprises a swinging bar 30 having secured to one end thereof any preferred type of electric motor 31, as at 32. The forward end of the bar 30 carries a bearing sleeve 33 in which is rotatably mounted the drive shaft 34. The outer end of the drive shaft 34 has keyed or otherwise secured thereto a pulley 35 which is in alinement with a pulley wheel 36 keyed or otherwise secured to the armature shaft of the motor 31. These pulley wheels are connected together by a suitable belt 37. As intimated the undercutting wheel E is removably associated with the drive shaft 34 and the wheel is provided with an axially extending shank 38 which is connected with the shaft 34 by any preferred type of socket 39 clearly shown in Figure 6 of the drawings. This allows different sizes and types of wheels to be used with the tool. As shown the wheel E includes radially extending cutting teeth 40 for operating on the mica strips 15. The lower face of the frame bar 30 adjacent to the end thereof which supports the motor D has secured thereto any preferred type of hand grip 41.

The means of associating the swinging frame C with the supporting frame B forms one of the important features of the invention, and by this means a relatively long stroke for the cutting wheel is obtained and the wheel is permitted to lie parallel with the mica strips at all times. This connecting means embodies a link 42 which is pivotally connected at its upper end, as at 43 to the plate 10 of the supporting frame B adjacent to the rear edge thereof and at its lower end, the same is connected by means of a pivot bolt 44 with the frame bar 30 at a point intermediate the ends thereof. Thus the swinging frame is connected by two pivot points with the supporting frame.

In use of the improved tool the foot 20 is placed on the upper surface of the riser 16 of the commutator and the lower edge of the plate 11 is laid directly on the commutator parallel with the mica strips. The foot is adjusted relative to the height of the risers and the leg 19 is also adjusted so as to engage the front face of the risers. The tool is now ready for operation and current is allowed to flow through the motor by any suitable type of control means which will bring about the rotation of the wheel 40. The right hand of the user is preferably around the handle 41, while the left hand is about the hand grip 13 to form means for steadying the supporting frame. By swinging the frame C the wheel is brought into engagement with the mica strips 15 and the wheel is moved along said strips parallel therewith, bringing about the undercutting thereof. By guiding the frame C the wheel 40 can be held in contact with the mica strip with the same pressure during the entire movement of the wheel. The frame resting upon the commutator relieves the weight of the device from the user and insures the easy manipulation of the tool. In some instances where the commutator is of relatively great size and the risers extend a relatively great distance beyond the periphery of the commutator the leg 18 can be entirely removed and the leg 19 only used. In this contingency the leg 19 is adjusted so as to rest upon the commutator directly in front of the riser.

While I have shown pulley wheels and a pulley belt for connecting the armature shaft of the motor 31 with the drive shaft 34 it is to be understood that any other suitable means can be employed for connecting the shafts together, such as sprocket wheels and a silent sprocket chain, or in some instances a train of gearing can be used.

When the swinging frame is in position of rest the bar 30 is adapted to strike against the stop 26 which holds the frame in a substantially horizontal position.

Owing to the portability of the tool, the same will be found especially advantageous for use in conjunction with mining machinery, as the tool can be brought directly into the mine eliminating the necessity of dismantling the machinery. In actual practice the commutator can be acted upon by the tool by simply removing one of the brushes and brush holders.

In some types of tools, especially those types which are to be used in conjunction with extraordinary large armatures, the motor can be secured directly to the supporting frame B above the swinging frame C, as shown in Figure 7 of the drawings. In this form a flexible drive shaft 50 is utilized for connecting the armature shaft of the motor with the drive shaft 34. As shown in this figure the handle 41 in such instance is secured to the upper surface of the frame bar 30.

Changes in details may be made without departing from the spirit or the scope of this invention, but

What I claim as new is:

1. A portable tool for undercutting the mica strips of commutators comprising a supporting frame for engaging and resting solely upon the commutator, a swinging frame carried by the supporting frame, an operating motor, a drive shaft rotatably carried by the swinging frame and operated from said motor, a rotary tool secured to the shaft for engaging the mica strips and a manipulating handle secured to the swinging frame.

2. A portable tool for undercutting the mica strips of commutators comprising a supporting frame for resting directly and solely upon said commutators, a swinging frame, an operating shaft rotatably carried by the frame, a tool secured to the drive shaft for acting upon the mica strips, a drive motor for operating said drive shaft, and means connecting the swinging frame to the supporting frame whereby the mica strip operating tool can be moved longitudinally of the strip in parallel relation thereto throughout the entire length thereof.

3. A portable tool for undercutting the mica strips of commutators comprising a supporting frame including a plate for resting directly upon the commutator and an adjustable leg for engaging a riser of one of the commutator segments, a swinging frame carried by and arranged laterally of the supporting frame, a drive motor, a drive shaft rotatably carried by the swinging frame, means operatively connecting the motor with the drive shaft, an undercutting wheel detachably connected with the shaft, and manipulating handles secured respectively to the supporting frame and swinging frame.

4. A portable tool for undercutting the mica strips of commutators comprising a supporting frame including inner and outer spaced plates, the outer plate being of a greater length than the inner plate and extending below the same for resting directly upon the commutator in parallel relation with the mica strips, an adjustable supporting leg carried by the inner plate for engaging a riser of one of the segments of the commutator, a swinging frame, means connecting the swinging frame with the supporting frame whereby the swinging frame can be swung in a horizontal plane at all times, a mica strip engaging tool rotatably carried by the swinging frame, a drive motor, and means operatively connecting the motor with the rotatable mica strip engaging tool.

5. A portable tool for undercutting mica strips of commutators comprising a supporting frame including inner and outer spaced plates, a hand grip secured to said plates, a swinging frame including a frame bar, means operatively connecting the frame bar with the supporting frame, whereby the frame bar can be moved in parallel relation to the commutator at all times, means carried by the supporting frame for engaging the commutator, a drive motor, a rotatable mica strip cutting tool rotatably carried by the swinging frame, means operatively connecting the motor with the cutting tool, and a manipulating handle secured to the frame bar.

6. A portable tool for undercutting the insulating strips of a commutator comprising a supporting frame including inner and outer spaced plates, the outer plate extending below the inner plate for resting directly upon the commutator, an adjustable leg secured to the inner plate, a foot upon said leg for resting upon the riser of the commutator, a second leg adjustably associated with the supporting frame and movable independently of the first leg for engaging the inner face of the riser and the periphery of the commutator, a swinging frame, a rotatable drive shaft carried by the swinging frame, a cutting wheel detachably associated with the shaft, a drive motor, means operatively connecting the motor with the drive shaft, a manipulating handle secured to the swinging frame, and means pivotally connecting the swinging frame with the supporting frame.

7. A portable tool for undercutting the mica strips of commutators comprising a supporting frame including an outer plate for resting directly upon the commutator, and an adjustable leg for engaging the commutator at a point spaced from said plate, a steadying handle secured to the supporting frame, a swinging frame including a frame bar, a manipulating handle secured to the frame bar, a drive shaft rotatably carried by the forward end of the frame bar, a drive motor, means operatively connecting the motor with the drive shaft, a cutting wheel detachably connected with the drive shaft, and a link pivotally connected to the frame bar at a point intermediate the ends of the frame bar and to the supporting frame at a point above said frame bar.

8. A portable tool for undercutting mica strips of a commutator comprising a supporting frame including inner and outer spaced plates arranged in parallel relation, a hand grip secured to said plates, the outer plate extending below the inner plate for resting directly upon the commutator, adjustable legs carried by the inner plate for engaging the commutator at a point spaced from the outer plate, a swinging frame including a horizontally disposed frame bar, an operating shaft rotatably carried by the forward end of the frame bar, a cutting tool carried by said shaft, a drive motor secured to the rear end of the frame bar, means operatively connecting the motor with the drive shaft, a manipulating handle secured to the frame bar, a link, means pivotally securing the upper end of the link to the inner plate, means pivotally securing the lower end of the link to the frame bar intermediate the ends thereof, and a stop carried by the inner plate and disposed in the path of the frame bar for limiting the swinging movement thereof in one direction.

In testimony whereof I affix my signature.

ELBA O. ADKINS.